Patented May 25, 1943

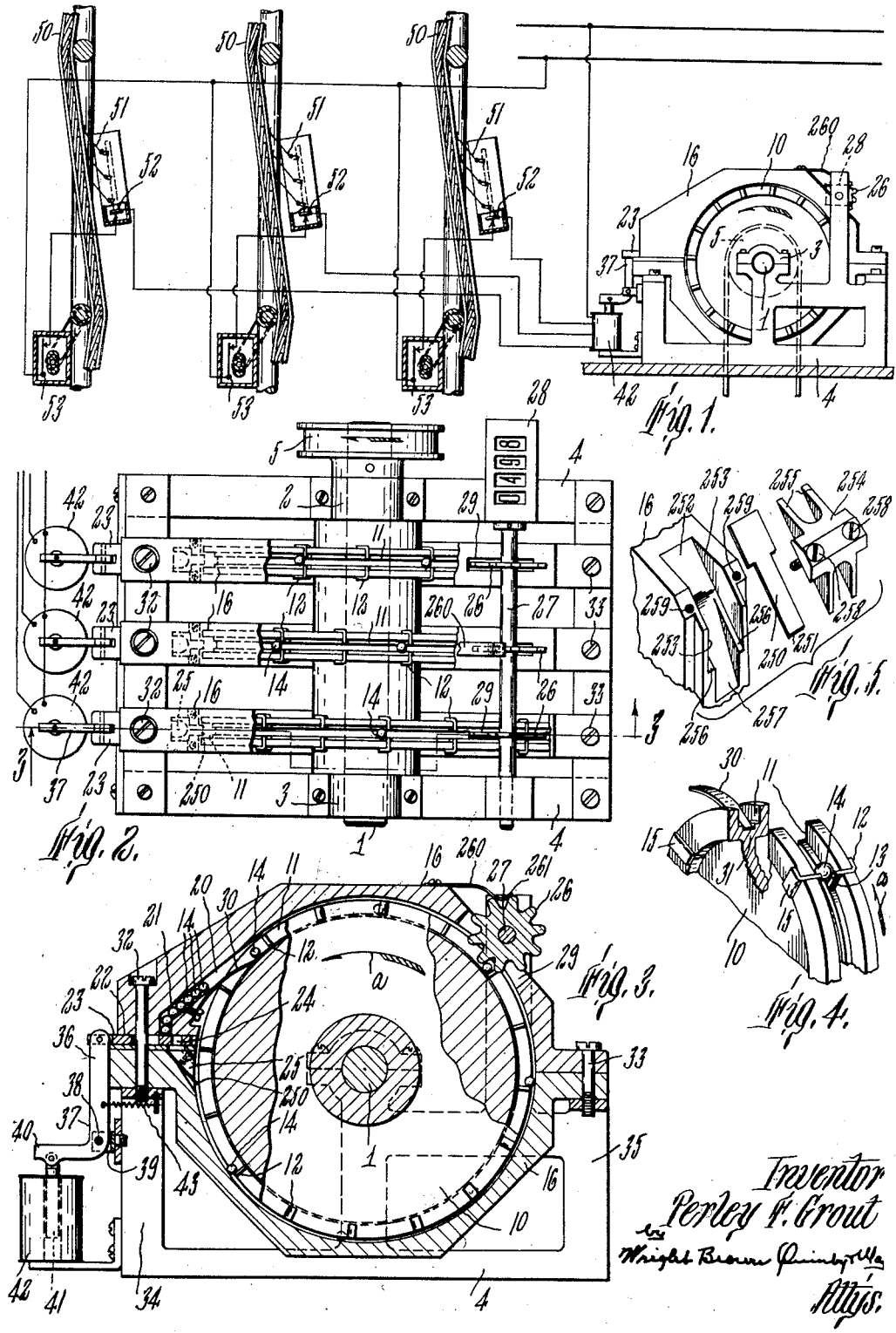

2,320,275

UNITED STATES PATENT OFFICE 2,320,275

TOTALIZER

Perley F. Grout, Wakefield, Mass.

Application August 7, 1941, Serial No. 405,811

3 Claims. (Cl. 235—91)

This invention relates to mechanism for totalizing counts from a plurality of mechanisms and has for an object the production of a totalizer such that even though two or more such mechanisms should count at the same instant, the totalizer will tally each count individually as though the mechanisms had been operated at different times.

A further object is to simplify and improve such totalizing mechanism.

For a more complete understanding of this invention, together with further objects and advantages, reference may be had to the accompanying drawing in which Figure 1 is a somewhat diagrammatic side elevation of a totalizer embodying the invention, and showing it applied to one specific use.

Figure 2 is a top plan view of a machine to a larger scale.

Figure 3 is a vertical transverse sectional view on line 3—3 of Figure 2 through one of the registering units.

Figure 4 is a fragmentary detail in perspective showing the manner in which the register actuating elements are removed from the wheel after having effected a registering action.

Figure 5 is an exploded perspective view showing a ball retaining spring and its mounting.

Referring to the drawing, at 1 is indicated a shaft mounted for rotation in suitable bearings 2 and 3 in side frame members 4. Outwardly of one of the bearings such as 2, the shaft 1 has fixed thereto means such as a belt pulley 5 by which the shaft may be rotated. This shaft 1 is arranged to operate a plurality of endless conveyors. As shown each conveyor comprises a wheel 10 having a peripheral groove 11 therein. This groove 11 is bridged across at intervals by partitions 12 shown as slotted centrally as at 13, this slot being of less width than the groove 11 so that the partitions define with the side walls of the groove 11 a plurality of pockets around the periphery of the wheel, sufficiently closed at their ends where the partitions 12 are located to retain within them counter actuating elements such as balls 14. As shown each partition is formed of a pair of spaced angle elements 15 seated in slots in the periphery of the wheel 10 on the side of the groove 11.

Each of these wheels 10 is partially enclosed by a casing 16 which closes off the outer face of the groove 11 of the corresponding wheel. As shown three wheels 10 are employed, together with the same number of casing elements 16, but the number to be employed will depend upon the number of individual counting mechanisms which are to be totalized by the mechanism of this invention. Where three are employed, three counting mechanisms can be totalized. The ball elements 14 are arranged to be stored in a channel 20 leading off from the groove 11 of the corresponding conveyor wheel above the horizontal plane of its axis, this channel 20 being continued as a hole 21 within the casing 16 which acts as a reservoir to receive a number of the balls 14. This number should be at least as large as the number of pockets in the corresponding wheel.

The lower end of the perforation 21 opens into a slot 22 within which is slidable a flat valve 23. This valve 23 has a hole 24 therethrough and the thickness of the valve 23 is so chosen that this hole 24 provides a cavity within which a single ball 14 may ride. This valve 23 is movable between a position where the lower end of the perforation 21 is closed off, as shown in Figure 3, to an outer position where a ball from the perforation 21 may drop into the hole 24 and then by pushing the valve 23 inwardly into the position shown in Figure 3, this opening 24 is positioned above a passage 25 which permits the ball so engaged by the valve 23 to drop out of the hole 24, and pass through the passage 25, into one of the pockets of the wheel 10 which happens to be presented thereto at the time the ball reaches the periphery of the wheel 10. It will be noted, however, that on actuation of the valve 22 inwardly, but one ball is transferred from the reservoir to the passage 25 to pass into one of the pockets of the wheel 10. The return or outer stroke of the valve 23 is idle and serves to again position the hole 24 in the valve beneath the reservoir 21 so that a single ball may pass thereinto.

In order to prevent the possibility of a ball becoming jammed between one of the partitions 12 and the inner lower edge of the corresponding ball discharge passage 25, which would result in stopping the machine or cause damage thereto, or both, each passage 25 is provided with a yieldable lower wall member comprising a leaf spring 250. The lower end 251 of this spring is positioned adjacent to the wheel groove 11. This spring has a widened upper portion adapted to engage flat against the back inclined wall 252 of the passage 25 (see Figures 3 and 5) and between its side walls 253, and it is held clamped against this back wall 252 by a block 254 constituting the upper and outer wall of the passage 25 and having spaced web members 255, the upper portions of which press against the edge portions of the upper widened end of the spring 250 and the lower portions of which lie along side ledges 256 of the more sharply inclined lower portion 257 of the passage 25. The block 254 may be secured in position by screws 258 engaging in threaded holes 259 in the adjacent face of the casing element 16. The free lower end of the spring 250 directs a ball dropping through the passage 25 into the wheel groove 11 and should the ball be caught between it and the following partition 12, as the wheel rotates, the spring end yields downwardly, allowing the partition to pass so that the ball may fall into the wheel pocket behind it.

The casing 16, as before noted, closes off the outer face of the wheel 10 for the greater part of its periphery and thus acts to close off the outer face of the groove 11 for the greater portion of its circumference, thus to retain a ball fed into the passage 25 by the valve while the pocket is passing around the greater portion of the circumference of the wheel. At one position, herein shown as toward the back of the machine, where the pockets are being lifted as the wheel 10 is rotated in the direction of the arrow a, the casing 16 is provided with a slot 29 therethrough within which rides the peripheral portion of a toothed wheel 26 carried by a countershaft 27. This countershaft 27 carries a toothed wheel 26 for each of the conveyor wheels 10, and it leads into a counting device 28 of any usual or convenient type by which the number of step by step rotary motions of the shaft 27 exerted by a ball 14 passing around with any of the conveyor wheels 10, is registered. In order to insure a uniform amount of rotation of the shaft 27 at each actuation, a spring detent 260 having a free curved end 261 bearing against the periphery of the adjacent wheel 26 is secured at its outer end to one of the casing elements 16.

It will be noted by inspection of Figure 2 that the partitions 12 of the several counter wheels are out of alinement axially lengthwise of the shaft 1, while the counter star wheels 26 are in axial alinement. It thus follows that only one ball 14 is effective to turn the shaft 27 at any one time, since no matter when a counter ball is released from its reservoir to pass into one of the pockets, it is effective to turn the shaft 27 only when the lower partition 12 of such pocket is so positioned angularly as to press a ball contained in that pocket past the corresponding star wheel 26. Thus whenever a ball is released from the reservoir in any of the plurality of conveyors, this ball is effective to register on the totalizer counter 28, but only when it has been carried around by its conveyor to a position where it can actuate one of the star wheels 26.

After having acted upon the star wheel, it is necessary to remove the counter ball 14 from the wheel, otherwise it would have a counting action during each rotation of the conveyor wheel 10. For this purpose a spring ejector finger 30 has been provided, this finger being sufficiently narrow to ride through the slots 13 of the partitions 12 and to have its free upper end riding in a central deepened portion 31 of the base of the peripheral groove 11 such as to cause the ball 14 within any of the pockets to roll outwardly on the upper face of the finger 30 out of the pocket and follow down this upper face into the reservoir 20 where it is in position to be used again as one of the counter actuating elements. As shown, for convenience, the casing 15 is made in upper and lower parts which are joined together by the screws 32 and 33 at their ends and are secured thereby to cross frame members 34 and 35, respectively, of the machine.

Each of the valves 23 is arranged to be actuated by a counting impulse and as shown these counting impulses are presented to the machine as electrical impulses. Each of the valves 23, therefore, is shown as having pivoted to its outer end the upper arm 36 of a bell crank lever 37 which may be fulcrumed as at 38 to a part 39 secured to the machine frame. Each of these bell crank levers 37 is provided with a horizontal arm 40 to which is secured a core 41 of a solenoid 42. Whenever the solenoid is energized the core 41 is drawn downwardly thus rocking the bell crank lever 37 and pulling the corresponding valve 23 outwardly into position to receive a ball 14 from the reservoir 21 into the valve opening 24. When this impulse is released, a spring 43 secured to the arm 36 of the bell crank lever and to a fixed point on the machine frame returns the valve to the position shown in Figure 3, thus releasing the ball taken by the valve 23, for discharge through the passage 25 and into one of the wheel pockets. As the shaft 1 continues to rotate, this ball so released passes around with its wheel 10 and effects a counting motion of the shaft 27 and is thereafter removed from the pocket by the finger 30 and returned to the reservoir. Thus while the action of the totalizer in registering is somewhat later than the actuation of its valve 23, such totalizing action does take place and even though two or more of the solenoids 42 may be energized and released simultaneously to release counting balls for a counting action, these balls act at different times on their respective star wheels so that each is effective to give a counting indication to the totalizing counter 28.

In Figure 1 there is shown somewhat diagrammatically the application of this totalizer to a plurality of newspaper counting mechanisms such as is shown in my Patent No. 2,208,270 granted July 16, 1940. These newspaper counting mechanisms are applied to the three newspaper conveyors 50 by which an electric switch 53 is closed periodically during operation of the corresponding conveyor, except at such times when papers are omitted from the conveyor, whereupon any one of a plurality of feeler fingers 51 normally engaging the papers open a switch 52 in series with the counter switch 53 for the respective conveyor. Each of these counter switches 53 is connected up in series with a switch 52 to one of the solenoids 42, so that whenever a counting impulse for each of the conveyors is made, it sets in motion the train of mechanism which are effective to actuate the totalizer counter 28. While this specific application of the invention has been illustrated herein, it will of course be understood that the use of the totalizer is not limited to any particular mechanism or type of mechanism.

It will be noted that for each of the sources of counting impulses which are to be totalized there is a separate unit comprising a wheel 10, its casing 16 and parts carried thereby, and a star wheel 26. It is therefore a simple matter to add or remove units corresponding to variations in the number of sources from which impulses are to be totalized. For example, suppose that a printing establishment originally having three presses and with a totalizer having three wheel units for totalizing the output therefrom finds it advisable to add two more presses. It is then only necessary to associate two more totalizing units driven by the same shaft and to add two more star wheels to the shaft 27 or to an extension thereof, each of these additional totalizers being connected up with the two additional presses and care being taken only that the angularity of all of the conveyor wheels 10 to the drive shaft shall be adjusted so that their partitions 12 are all out of alinement axially so that the shaft 27 is turned by only one of the balls released in the various units at a single time.

From the foregoing description of an embodiment of this invention, it should be evident to those skilled in the art that various changes or modifications might be made without departing from the spirit or scope of this invention as defined by the appended claims.

I claim:

1. A totalizer comprising a shaft, a plurality of wheels carried by said shaft, each of said wheels having a peripheral groove, slotted partitions arranged at intervals across said grooves and defining therewith a plurality of pockets, the partitions of the several wheels being out of alinement lengthwise of said shaft, casing means closing off the outer faces of said grooves and having a channel leading from the periphery of each wheel above its axis and a channel leading to said periphery below said first mentioned channel, said first mentioned channel constituting a ball-receiving reservoir, a valve movable to take a ball from said first-mentioned channel and deliver said ball to the other of said channels to pass therefrom into one of said wheel pockets, a second shaft, a star wheel for each of said pocket wheels fixed to said second shaft and positioned to be struck by a ball in any of the pockets of the corresponding wheel to thereby turn said second shaft, a counter actuated by the turning of said second shaft, a guide finger projecting into each of said grooves and in line with the slots of said partitions and between said star wheels and channels and positioned to guide the balls from said groove and conduct them into their respective first-mentioned channels, means for rotating said wheel carrying shaft, and means individual to each valve for actuating said valves.

2. A totalizer comprising a shaft, a plurality of wheels carried by said shaft, each of said wheels having a peripheral groove, slotted partitions arranged at intervals across said grooves and defining therewith a plurality of pockets, the partitions of the several wheels being out of alinement lengthwise of said shaft, casing means closing off the outer faces of said grooves and having a channel leading from the periphery of each wheel above its axis and a channel leading to said periphery below said first mentioned channel, said first mentioned channel constituting a ball-receiving reservoir, a valve movable to take a ball from said first-mentioned channel and deliver said ball to the other of said channels to pass therefrom into one of said wheel pockets, a second shaft, a star wheel for each of said pocket wheels fixed to said second shaft and positioned to be struck by a ball in any of the pockets of the corresponding wheel to thereby turn said second shaft, a counter actuated by the turning of said second shaft, a guide finger projecting into each of said grooves and in line with the slots of said partitions and between said star wheels and channels and positioned to guide the balls from said groove and conduct them into their respective first-mentioned channels, means for rotating said wheel carrying shaft, and an electrically actuated tripping device for actuating each of said valves.

3. A totalizer comprising a shaft, a plurality of wheels carried by said shaft, each of said wheels having a peripheral groove, slotted partitions arranged at intervals across said grooves and defining therewith a plurality of pockets, the partitions of the several wheels being out of alinement lengthwise of said shaft, casing means closing off the outer faces of said grooves and having a channel leading from the periphery of each wheel above its axis and a channel leading to said periphery below said first mentioned channel, said first mentioned channel constituting a ball-receiving reservoir, a valve movable to take a ball from said first-mentioned channel and deliver said ball to the other of said channels to pass therefrom into one of said wheel pockets, said other channel having a yieldable lower wall portion to prevent jamming of a ball between it and one of said partitions, a second shaft, a star wheel for each of said pocket wheels fixed to said second shaft and positioned to be struck by a ball in any of the pockets of the corresponding wheel to thereby turn said second shaft, a counter actuated by the turning of said second shaft, a guide finger projecting into each of said grooves and in line with the slots of said partitions and between said star wheels and channels and positioned to guide the balls from said groove and conduct them into their respective first-mentioned channels, means for rotating said wheel carrying shaft, and means individual to each valve for actuating said valves.

PERLEY F. GROUT.